United States Patent [19]

Lane

[11] 4,294,066

[45] Oct. 13, 1981

[54] METHOD AND APPARATUS FOR DISPLAYING SPECIFIC SPINNING MACHINE OPERATING CONDITIONS

[75] Inventor: John E. Lane, Littleton, Mass.

[73] Assignee: Parks-Cramer Company, Fitchburg, Mass.

[21] Appl. No.: 77,931

[22] Filed: Sep. 24, 1979

Related U.S. Application Data

[63] Continuation-in-part of Ser. No. 900,267, Apr. 26, 1978, Pat. No. 4,194,349.

[51] Int. Cl.$^3$ .................... D01H 13/32; G06F 11/32; H04Q 9/00

[52] U.S. Cl. .................... 57/265; 57/81; 340/518; 340/525

[58] Field of Search .................... 57/80, 81, 264, 265; 340/517, 518, 524, 525, 720, 721, 748, 752, 366 CA, 870.41

[56] References Cited

U.S. PATENT DOCUMENTS

| | | | |
|---|---|---|---|
| 3,523,413 | 8/1970 | Ford et al. | 57/81 X |
| 3,638,191 | 1/1972 | Mann | 340/518 X |
| 3,680,298 | 8/1972 | Saunders | 57/81 X |
| 3,726,072 | 4/1973 | Ford et al. | 57/265 |
| 3,974,497 | 8/1976 | Ohkawa et al. | 340/748 X |
| 4,000,603 | 1/1977 | Lee, Jr. | 57/87 |
| 4,001,785 | 1/1977 | Miyazaki et al. | 340/518 X |
| 4,001,807 | 1/1977 | Dallimonti | 340/525 X |
| 4,017,683 | 4/1977 | Pederson et al. | 340/518 X |
| 4,136,511 | 1/1979 | Raasch | 57/265 |
| 4,146,884 | 3/1979 | Kurn | 340/518 |
| 4,194,349 | 3/1980 | Lane | 57/265 |

*Primary Examiner*—John Petrakes

[57] ABSTRACT

Apparatus and method for facilitating efficient management of manufacture by ring spinning machines in a textile mill through the use of a data system wherein sensors are provided on each machine for signalling operating characteristics of the machines, and processors operatively communicating with the sensors and responsive to signals from the sensors determine from such signals the operating conditions of respective ones of the machines. In accordance with this invention, an input device permits entering a request for display of information characteristic of selected individual operating conditions of selected individual spinning machines, with an output device then producing such display.

16 Claims, 7 Drawing Figures

METHOD AND APPARATUS FOR DISPLAYING SPECIFIC SPINNING MACHINE OPERATING CONDITIONS

RELATED APPLICATIONS

This application is a continuation-in-part of co-pending application Ser. No. 900,267 filed Apr. 26, 1978, now U.S. Pat. No. 4,194,349 issued Mar. 25, 1980 and entitled "Apparatus and Method for Gathering and Displaying Information".

FIELD AND BACKGROUND OF INVENTION

As is pointed out in the aforementioned parent disclosure and as disclosed in prior U.S. Pat. Nos. 3,523,413; 3,726,072; and 4,000,603, effort has been expended heretofore toward optimizing the manufacturing efficiency of machines and methods involved in forming textile yarn. Particularly with regard to ring spinning machines, as evidenced by the aforementioned related disclosures, such development has included apparatus and methods for detecting broken yarns on ring spinning machines, interrupting the supply of roving strand materials to the drafting systems by which attenuated strand materials are formed as a portion of the process of spinning yarn, and providing information to machine operators and mill management concerning operating conditions of the machines.

As the apparatus and methods proposed in accordance with the aforementioned prior patents have achieved acceptance and some success in textile mills, and as operators and managers have learned to use reported information to increasing advantage, the desirability of providing yet further information for the assistance of operators and managers has been appreciated. More particularly, it has been recognized that data captured and stored by a data processing system may well include specific information which would be of interest to or even necessary for an operator or manager.

BRIEF DESCRIPTION OF INVENTION

With the foregoing in mind, it is an object of this invention to facilitate more efficient use of a data processing system which captures and stores data with respect to the operation of ring spinning machines in a textile mill. In realizing this object of the present invention, specific information concerning specific operating conditions of the machines is called up for visual display so as to be made available to operators and managers.

A further object of the present invention is to accomplish the displaying of specific information regarding the operating conditions of a selected spinning machine in a textile mill in response to inquiries and in a manner which provides management with a numerical, visual display of data which has been collected and stored. In realizing this object of the present invention, data regarding various operating characteristics of each machine in a group are sensed, collected and stored. Thereafter, by specific inquiries identifying a machine and an operating characteristic, the stored data is retrieved and displayed.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described hereinafter with particular reference to the accompanying drawings, it is to be understood at the outset of the following description that persons skilled in the arts applicable to the present invention will be enabled by this disclosure to construct apparatus and practice methods which embody the present invention and yet take forms which may differ from those here particularly described and shown. Accordingly, the description which follows is to be understood broadly as an enabling disclosure directed to persons skilled in the appropriate arts, and is not to be taken as being restrictive upon the scope of the present invention.

Figure 1:
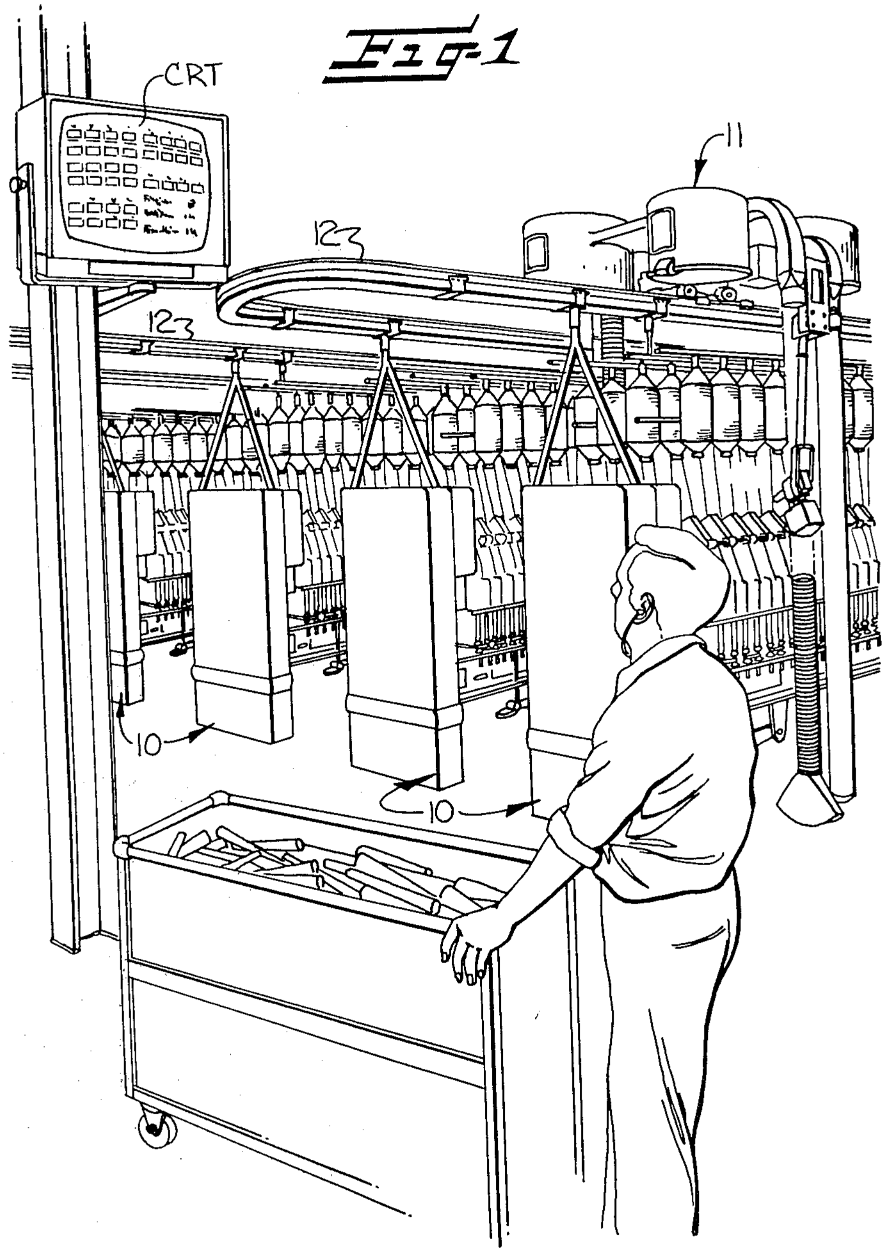
FIG. 1 is a perspective view of a textile mill incorporating an installation of an apparatus in accordance with the present invention.
Figure 2:
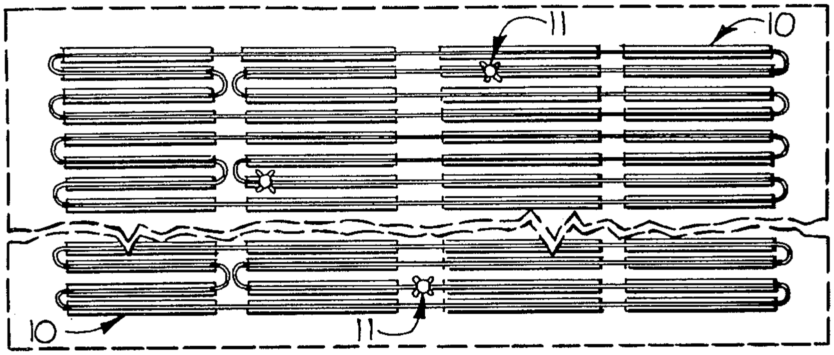
FIG. 2 is a partly schematic plan view of a textile mill similar to that of FIG. 1, illustrating a plurality of spinning machines.

Referring now more particularly to the drawings, the present invention is contemplated as being particularly useful in connection with a plurality of ring spinning machines, certain of which are indicated generally at 10 (FIG. 1), arranged in a plurality of rows in a textile mill. One typical arrangement is schematically illustrated in FIG. 2, where spinning frames are arranged in rows of four. One or more traveling units, one of which is generally indicated at 11 in FIG. 1, are supported for traversing the textile machines 10 along predetermined paths of travel. In the drawings, and consistent with the disclosures of the aforementioned related prior patents, the traveling units 11 are substantially identical to the fourth embodiment disclosed in U.S. Pat. No. 3,304,571 owned in common with the present invention. As disclosed in that patent, each of the traveling units 11 is supported for movement along a track 12 extending above the spinning machines 10. Conventionally, such a track describes a closed pattern of so-called H-loop configuration (FIG. 2). Each traveling unit includes drive means for driving it in movement along the track so as to traverse the machines in a circuit automatically and at predetermined intervals.

The ring spinning machines 10 include elements or operating instrumentalities for receiving strand material in a form known as roving, drawing or attenuating the strand material, and twisting or spinning the attenuated strand material to form yarn. The operating instrumentalities of a ring spinning machine are well known to persons skilled in the applicable textile arts but will be noted to include front or delivery rolls 14 from which strand material issues, "pig tails" or intermediate guides 15 through which strand material passes, and rings 16 encircling spindles 18 and about which travelers move in twisting or spinning ends E of yarn. The rings 16 are mounted in ring rails 20 which move vertically relative to the spindles 18 and thereby position strand material relative to packages formed about bobbins received on the spindles 18 during winding.

In order to monitor the condition of ends of strand material normally being formed by a traversed machine 10, detectors are mounted on the traveling unit 11 in accordance with the teachings of the aforementioned related U.S. Pat. Nos. 3,523,413; 3,726,072; and 4,000,603. A data system is provided which is responsive to the detectors for determining the ends down condition of the traversed machine from the conditions of the monitored ends and may include apparatus constructed and operating to control actuation of roving feed stop devices such as are disclosed in the aforementioned patents and generally indicated at 21 and to communicate substantially continuously in accordance with the teaching of U.S. Pat. No. 3,680,298 owned in common with the present invention and hereby incorporated by reference into the present description to any extent necessary or appropriate to a complete understanding of the present invention. The data system additionally includes sensor means mounted on each of the ring spinning machines 10 for signalling certain operating characteristics of the machines. Processor means operatively communicate with the sensor means and respond to signals therefrom for determining from the signals the operating condition of respective ones of the machines. The processor means generate display signals indicative of the determined conditions. The display signals are communicated to a visual display means, which responds by presenting a visual display of the determined conditions of the machines. Specific preferred forms for such apparatus, and methods by which visual displays are presented, have been particularly pointed out in the disclosure of the related parent application mentioned above.

Figure 3:
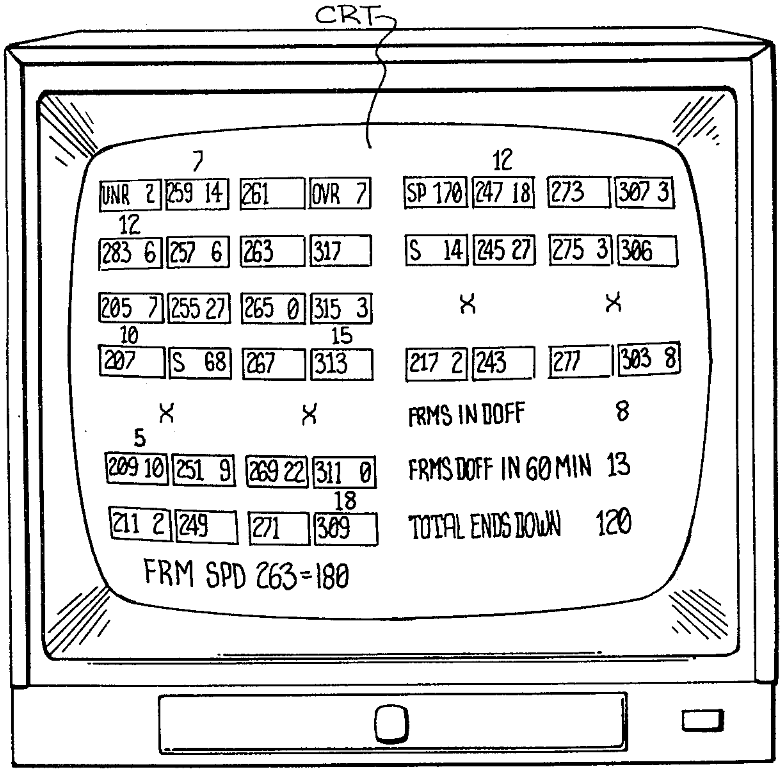
FIG. 3 is an elevation view of a visual display in accordance with the present invention, reflecting a display presented in response to a specific request.
Figure 4:
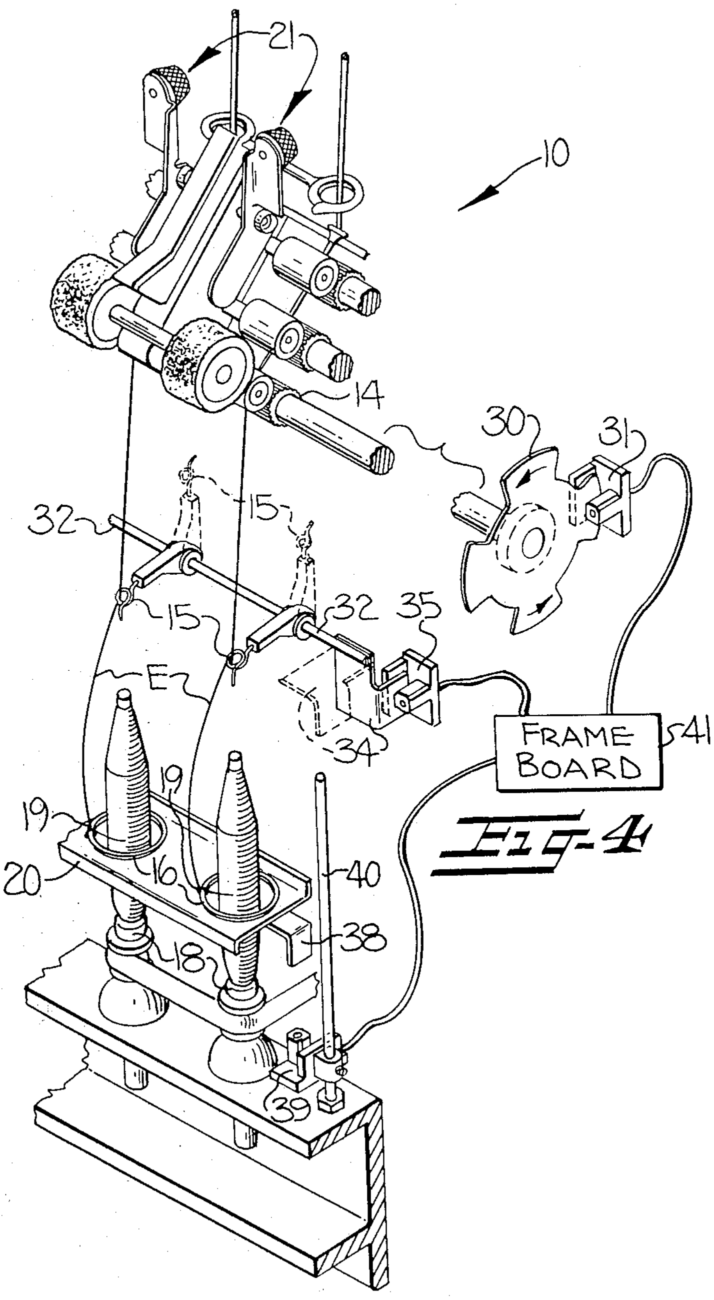
FIG. 4 is a partially schematic perspective view of certain components of a spinning machine.
Figure 5:
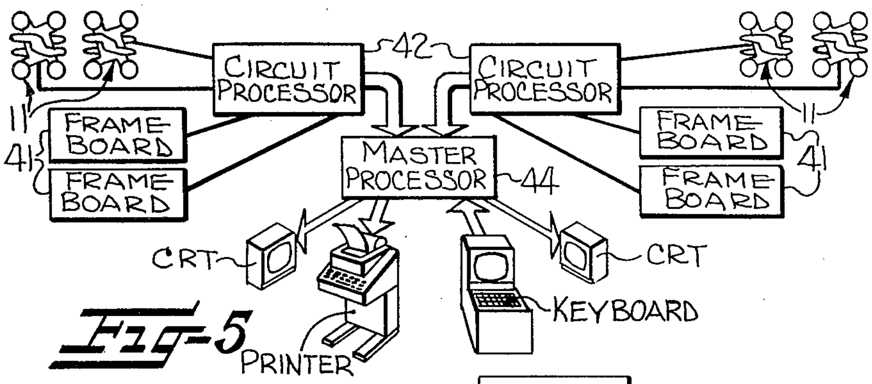
FIG. 5 is a schematic representation of the operative communication among certain components of apparatus in accordance with the present invention.

Preferably, and as illustrated in FIGS. 1 and 3, the visual display means takes the form of a cathode ray tube (hereinafter sometimes called a CRT) video device, similar to the well known television receiver set. The sensor means preferably comprises a plurality of sensors (FIG. 4) sensing a plurality of the operating characteristics of a machine. The processor means preferably takes the form of a plurality of frame boards corresponding in number to the number of ring spinning machines 10, a plurality of circuit processors which number a fraction of the number of the frame boards, and a single main processor (FIG. 5).

Referring now more particularly to the sensor means mounted on each machine, one sensor means takes the form of a suitable electrical device and associated components together functioning as a rotation sensor means for generating a train of electrical pulse signals at a frequency proportional to revolutions of the delivery rolls 14 from which strand material issues. In the form shown, a rotor 30 (FIG. 4) of a magnetic material such as steel is operatively interconnected with the delivery roll 14 to rotate therewith. The interconnection may be direct or indirect through gearing by which the rolls are driven. The rotor 30 has a plurality of radially extending vanes which pass adjacent a Hall effect device 31 responsive to variations in the magnetic field about the rotor 30 for generating a train of electrical pulse signals. Persons skilled in the electrical and the electronic arts will recognize that other forms of sensor means may be employed, such as other magnetic sensor devices, photoelectric sensor devices, or mechanically actuated switches.

The pig tail or intermediate guides 15 along the length of a ring spinning machine 10 are mounted on a common mounting rod or bar 32 in order to permit a doffer to readily move all of the guides to a raised or withdrawn position during doffing. In accordance with the present invention, suitable means, shown in the form of a flag or flap of magnetic material 34, are fixed to the common mounting bar 32 for movement with the intermediate guides 15. The flap or flag 34 cooperates with a device 35 (which again may be a Hall effect device or some other form of device) and provides a sensor means for generating an electrical signal upon movement of the guides 15 to a predetermined position indicative that the machine is being doffed. This is, when a doffer begins the process of doffing a ring spinning machine and moves the intermediate guides 15 to the withdrawn or raised position (to the phantom line positions in FIG. 4), the flap or flag 34 is withdrawn from the associated device 35 and an electrical signal is generated. While only a single device 35 is shown in FIG. 4, a plurality of sensors may be provided on any ring spinning machine having intermediate guides which are grouped into more than one grouping or area around the machine. Thus, a guide position signal would be generated upon movement of any group of intermediate guides to a position indicative of doffing occurring.

As pointed out hereinabove, the ring rail 20 positions strand material relative to packages during winding. As is known to persons skilled in the applicable textile arts, the ring rail 20 is moved vertically by a portion of the mechanism of a ring spinning machine 10 known as a "builder motion." At the time that doffing is appropriate, or as a first step in the doffing process, the ring rail 20 is moved to a lowered or depressed position substantially clear of the bobbins and wound packages being formed on the spindles 18 in order to provide ready access for the doffer. Such a movement, accomplished by the builder motion either automatically or under the control of a doffer, is known as "bearing down." In accordance with the present invention, a suitable flag or flap 38 is fixed to the ring rail 20 and cooperates with an associated device 39 (similar to the devices 31 and 35 described hereinabove) and provides a sensor means for generating an electrical signal upon movement of the rail 20 to a predetermined position indicative that the machine is ready to be doffed. In the form illustrated, the device 39 which cooperates with the ring rail flag or flap 38 is mounted upon an upright rod 40. The rod 40 may (if desired, but not shown) carry more than one device, in order to respond to movement of the ring rail 20 to other various positions. As is known to persons skilled in the applicable textile arts, certain "builds" of wound packages involve such movement of the ring rail 20 as will bring the rail to a distinctive particular position at some known interval of time in advance of the time for "bearing down" and the beginning of doffing. Where such a builder motion is used, a second device responsive to the position of the ring rail may originate an electrical signal indicative that the machine will be ready to be doffed at a particular time interval in advance of "bearing down."

As briefly pointed out hereinabove, the sensors mounted on each ring spinning machine 10 operatively communicate with processor means responsive to sensor signals for determining from the signals an operating condition of respective ones of the machines and generating a display signal indicative of the determined conditions. As additionally pointed out, the processor means preferably includes, at each spinning machine 10, frame board means 41 (FIGS. 4 and 5) which is operatively connected with at least one of the sensor means. In the form shown, the frame board means 41 is electrically connected with each of the rotation sensor means 31, guide position sensor means 35, and rail position sensor means 39. The frame board means 41 incorporates appropriate semiconductor logic circuit means (in forms known to persons skilled in the appropriate arts of data acquisition and processing) for receiving from the sensor electrical signals indicative of the ring rail position, of the intermediate guide position, and of rotation of the front rolls 14. Signals regarding the guide position and ring rail position are, in essence, stored or recorded awaiting inquiry as pointed out more fully hereinafter. Signals indicative of rotation of the delivery rolls 14 are counted, with the numerical count being stored for inquiry as pointed out more fully hereinafter. The frame board includes a universal asynchronous receiver-transmitter (sometimes referred to as a UART) for communication as described more fully hereinafter.

The frame boards 41 of a plurality of the spinning machines 10 communicate with a corresponding one of a plurality of circuit processor means 42 (FIG. 5). Each circuit processor preferably is a micro computer of a commercially available type such as an Intel System 80/10. In a typical textile mill installation having a plurality of ring spinning machines, a plurality of circuit processors 42 are provided, each communicating with a corresponding plurality of frame boards 41 through the use of UARTS. Each circuit processor receives signals not only from the corresponding plurality of frame boards 41 but additionally from portions of the data system carried aboard the traveling units 11, as described more fully in the aforementioned related prior patents incorporated by reference into the present disclosure. The circuit processors receive from the frame boards and traveling units signals indicative of the ring rail positions, guide positions, roll revolution count, ends down, and ends up. From such data, each circuit processor computes delivery rolls speeds in revolutions per minute, time intervals relevant to spinning machine operation as pointed out more fully hereinafter, and totaled ends up and down in order to check for errors in traveling unit operation.

A plurality of circuit processor means 42 communicate with a single main processor 44 (FIG. 5). As with the circuit processors, the main processor preferably is a micro computer of a commercially available type such as Intel System 80/10. The single main processor 44 communicates with the plurality of circuit processors 42 through the use of UARTS. The main processor 44 functions primarily as a master for the entire processor system, with the plurality of circuit processors and the plurality of frame boards responding to the main processor. The main processor receives from the plurality of circuit processors signals indicative of the time intervals relevant to spinning machine operation, delivery roll speeds, ring rail positions, guide positions signals, and ends down. From such data, the main processor computes the acceptability of ends down as pointed out more fully hereinafter and generates display signals in the format necessary to drive the visual display. In the form illustrated, where the visual display is a CRT video device, the main processor generates display signals appropriate for driving such a device. Additionally, the main processor sends to the circuit processors and thence to the appropriate frame boards signals indicative that any annunciator lamps provided at the respective spinning machines should be illuminated.

As will become clear from a thoughtful consideration of the levels of communication and information processing briefly described above, the processor means here described divides the tasks of performing data processing and storing processed information among the frame boards, circuit processors, and main processor. Such an arrangement has been adopted for this invention in the belief that it achieves the most reasonable balance between efficient data processing and cost effective use of apparatus available at the time of development of the present invention. However, persons skilled in the applicable arts of data processing will be able to appreciate that other arrangements of processors may be employed to achieve essentially the same result, ranging from the use of a single central processing unit for all data processing to a slight redistribution of the processing and storage functions and steps described herein. It is contemplated that the present invention would extend to all such variations in the manner in which data processing apparatus is arranged and employed to achieve the results here described.

Figure 6:
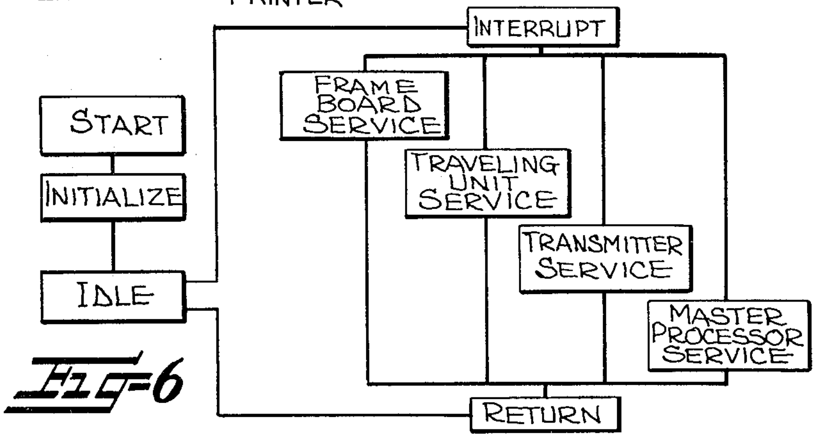
FIG. 6 is a schematic representation of the operation of a circuit processor incorporated in the apparatus according to the present invention.

Referring now more particularly to the operation of the circuit processors, it has been pointed out hereinabove that the circuit processors are used by the master processor essentially as slave devices. All requests originate from the master processor and lead to a particular sequence of operations in the circuit processors and the associated frame boards. Certain circuit processor programs have been diagrammatically represented in FIG. 6. As there suggested, programming (or software) for the circuit processors is a so-called single interrupt type. That is, the circuit processor operates essentially in an idle loop sub-routine, performing low priority tasks and awaiting some interrupt signal. Upon the occurrence of an interrupt signal, the idle loop is interrupted and the programming moves to one of a plurality of parallel sub-routines. At this point, all other possibilities of an interrupt are disabled until such time as the sub-routine chosen has been completed and the program cycles back to the idle loop. The sub-routines may include sub-routines known as frame service, transmitter service, master processor service and cleaner service providing for communication of information between the circuit processor and corresponding other elements of the arrangement in accordance with the present invention.

Figure 7:
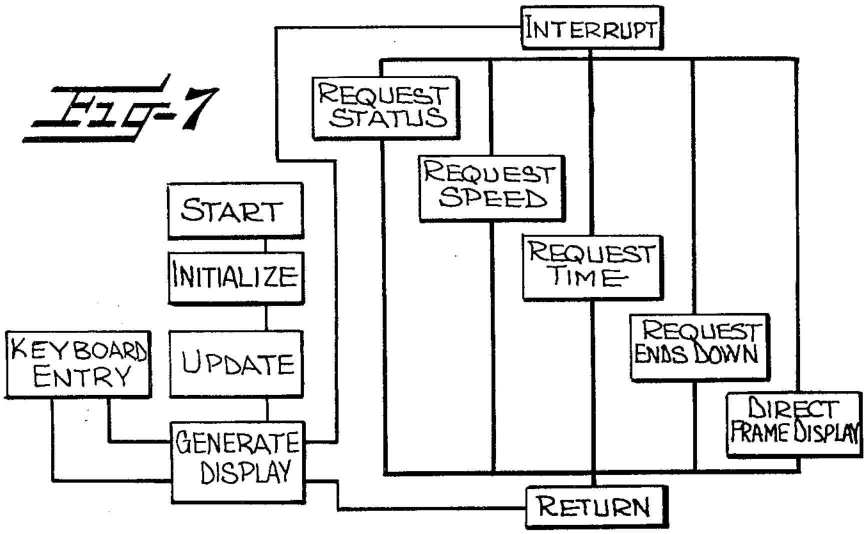
FIG. 7 is a schematic representation similar to FIG. 6 of the operation of a master processor incorporated in the apparatus of the present invention.

Programming for the main processor (as schematically represented in FIG. 7) is such that the master processor operates on two levels. One level is a background level which maintains display signals for visual display devices. The other level is a foreground level which handles communication with the circuit processors and supplies data for the background level. Both background and foreground programs run in loops and are concurrently running in the sense that they are independent one of the other as to their sequence. In point of view of operations, the background and foreground programs are interleaved one into another with interrupt routines and patches. While the foreground program, in effect, interrupts the background program, both may be interrupted by keyboard commands. In any such instance, specific sequences within the programs do not change, but are merely delayed. The foreground program is, in part, a loop polling the circuit processors in a predetermined sequence in order to communicate to the circuit processors requests originating from keyboard commands. Each foreground interrupt sequence is a series of sub-routines, each of which can branch by calling up other sub-routines. In such an arrangement, sub-routines may be nested one within another to substantial depth.

As an example of the manner in which communication may occur, communication between a circuit processor and one specific frame board may entail the interchange of a succession of four words with each word consisting of eleven binary bits. Each word communicated from a circuit processor to a frame board triggers a return word from the frame board to the circuit processor with the particular sequence of words serving to confirm system operation. For example, transmittal of an address word identifying a specific frame board calls for an answering status word including as a portion thereof a numerical representation of the then existing count of roll revolutions together with an indication of any frame signal lights which may be illuminated. The next following transmitted word may be a test word, to be answered by a word including an identification of the frame number. The next transmitted word from the circuit processor to the frame board may be an intentional dummy word, triggering as a response a repetition of the next preceding command word transmitted to that frame board. Thereafter, any new command word indicating the then desired state of the frame signal lights would be transmitted, to be answered by a repetition of the previously transmitted test word, completing a check of the system between the circuit processor and the respective frame board. A similar pattern of communication exists on a continuing polling basis between the foreground programs of the main processor and the circuit processors. The requests from the main processor may include a request for data concerning style and errors from varying frames, errors and roll speeds, command and status words being communicated, frame times, ends down information, and others.

Data thus gathered is available for specific requests and displays, in accordance with the present invention. More particularly, and as illustrated in FIG. 3, appropriate input means such as a keyboard (FIG. 5) may be used to enter a specific inquiry to the master processor 44. Such a specific inquiry may include an inquiry (as illustrated in the bottom line of the display shown in FIG. 3) concerning the speed of the delivery rolls of frame number 263. Such a specific request for a display might be entered by keying in an inquiry code or phrase followed by the number of the frame with respect to which data is to be displayed. Upon receipt of such an inquiry, and in accordance with the present invention, stored data representing the answer to the inquiry is identified, accessed, and processed to generate the requested display. In the illustrated instance, the rotational speed of the delivery rolls of frame number 263 is displayed as being 180 revolutions per minute. While the delivery roll rotational speed of a specifically identified frame has been chosen for illustrative purposes in FIG. 3, and this description has accordingly been directed to such a request and display, persons skilled in the arts applicable to this invention will appreciate that such a request and display may be directed to any specific item of information which has been stored within the data processing system.

Further, such a request for a specific display may additionally direct that the display be provided through means of a peripheral device other than a CRT, such as the printer indicated in FIG. 5. Where selection of a print media display is made, a permanent record for use by operators and managers is provided. As will be appreciated, such a print media format will provide a permanent record. Persons familiar with the operation of data processing apparatus of the types employed in the apparatus described herein will appreciate that the interconnection of the master processor with such a printer peripheral terminal can be accomplished in such a manner as to make possible the reduction of any of the data visually displayed to a permanent print media record. Further, accumulation of data over extended intervals of time will permit such print records to review operator and machine performance over relatively extended intervals of time such as a shift or longer.

In the drawings and specification, there has been set forth a preferred embodiment of the invention, and although specific terms are employed, they are used in a generic and descriptive sense only and not for purposes of limitation.

That which is claimed is:

1. In apparatus for displaying information regarding the operating conditions of a group of ring spinning machines in a textile mill wherein each machine has instrumentalities from which strand material issues and by which strand material is formed into packages during winding thereof, and detectors on each machine for signalling occurrences of events characteristic of certain operating conditions of the machines, and wherein the apparatus has at least one traveling unit supported for travel along a predetermined path for traversing one or more of the machines, and detectors mounted on the traveling unit for monitoring ends of strand material normally being formed by a traversed machine, and further wherein the apparatus has a data system responsive to the detectors on each machine and on the traveling unit for determining said operating conditions of each machine of the traversed group of machines, the improvement in the data system which comprises:

input means for entering a request for display of information characteristic of a selected individual operating condition of a selected individual spinning machine, and output means for displaying requested information in response to entry of a request through said input means.

2. Apparatus according to claim 1 wherein said output means comprises signal generating circuit means for generating display signals representative of requested information, and cathode ray tube video display means responsive to said signals generated by said circuit means for presenting an alphanumeric visual display of the requested information.

3. Apparatus according to claim 1 wherein said output means comprises a printer for printing onto print media alphanumeric indicia representative of requested information.

4. Apparatus according to one of claims 1, 2 and 3 wherein said input means comprises keyboard means for manual entry of requests.

5. Apparatus according to claim 1 wherein the detectors include rotation sensor means mounted on each machine for generating a train of electrical pulse signals at a frequency proportional to revolutions of delivery roll instrumentalities, the data system being responsive to sensor signals for determining from said signals the operating time remaining before doffing, and/or the roll speed in revolutions per minute, of respective ones of the machines and for generating an information signal indicative of the determined time and/or speed conditions, and the output means being responsive to information signals for presenting a numerical display of the determined time and/or speed conditions of the machines as requested.

6. Apparatus according to claim 1 wherein the detectors include guide position sensor means mounted on each machine for generating an electrical signal upon movement of guide instrumentalities to a predetermined position indicative that the machine is being doffed, the data system being responsive to sensor signals for determining from said signals that doffing is in progress at respective ones of the machines, and/or the interval of time required for doffing, and for generating an information signal indicative of the determined doffing and/or time conditions, and the output means being responsive to information signals for presenting a display of the determined doffing and/or time conditions of the machines as requested.

7. Apparatus according to claim 1, wherein the detectors include rail position sensor means mounted on each machine for generating an electrical signal upon movement of rails instrumentalities to a predetermined position indicative that the machine is ready to be doffed, the data system being responsive to sensor signals for determining from said signals the readiness for doffing of respective ones of the machines and for generating an information signal indicative of the determined doffing readiness conditions, and the output means being responsive to information signals for presenting a display of the determined readiness conditions of the machines as requested.

8. In apparatus for displaying information regarding the operating conditions of a group of ring spinning machines in a textile mill wherein each machine has instrumentalities from which strand material issues and by which strand material is formed into packages during winding thereof, and detectors on each machine for signalling occurrences of events characteristic of certain operating conditions of the machines, and further wherein the apparatus has a data system responsive to the detectors on each machine for determining said operating conditions of each machine of the group of machines, the improvement in the data system which comprises:

input means for entering a request for display of information characteristic of a selected individual operating condition of a selected individual spinning machine, and output means for displaying requested information in response to entry of a request through said input means.

9. Apparatus according to claim 8 wherein said output means comprises signal generating circuit means for generating display signals representative of requested information, and cathode ray tube video display means responsive to said signals generated by said circuit means for presenting an alphanumeric visual display of the requested information.

10. Apparatus according to claim 8 wherein said output means comprises a printer for printing onto print media alphanumeric indicia representative of requested information.

11. Apparatus according to one of claims 8, 9 and 10 wherein said input means comprises keyboard means for manual entry of requests.

12. In a method of displaying information regarding the operating conditions of ring spinning machines in a textile mill wherein strand material issues from delivery rolls and passes through intermediate guides and is positioned by ring rails during winding, the method including the steps of sensing at each machine occurrences of events characteristic of certain operating conditions of that machine and signalling such sensed occurrences, and determining from signalled, sensed occurrences certain operating conditions of respective ones of the machines; the improvement in the displaying of indicia which comprises:

entering a request for display of information characteristic of a selected individual operating characteristic of a selected individual spinning machine, and displaying requested information in response to entry of such request.

13. A method as claimed in claim 12, including traversing one or more machines with a traveling unit having a detector moving therewith while monitoring ends of strand material normally being formed by a traversed machine, and responding to the monitoring of ends by determining the ends down condition of the traversed machine.

14. A method as claimed in one of claims 12 and 13, which includes:

sensing at each machine revolutions of the rolls of that machine and generating a train of electrical pulse signals having a frequency proportional to such sensed movement, determining from said pulse signals the rotational speed of the rolls of respective ones of the machines, and/or the time interval remaining before doffing, and generating as requested display signals indicative of the determined speed and/or time conditions, and displaying numerical indicia representative of the determined speed and/or time conditions in response to the generated requested display signals.

15. A method as claimed in one of claims 12 and 13 which includes:

sensing at each machine movement of the guides to a predetermined position indicative of doffing of the machine and generating an electrical signal in response to such sensed movement, determining from said electrical signals the occurrence of doffing of respective ones of the machines and/or the time interval during which doffing occurs and generating as requested display signals indicative of the determined doffing and/or time conditions, and displaying numerical indicia representative of the determined doffing and/or time conditions in response to the generated display signals.

16. A method as claimed in one of claims 12 and 13, which includes:

sensing at each machine movement of the rails to a predetermined position and generating an electrical signal in response to such sensed movement and indicative that the machine is ready to be doffed, determining from said electrical signals the readiness for doffing of respective ones of the machines and generating as requested display signals indicative of the determined doffing readiness conditions, and displaying numerical indicia representative of the determined conditions in response to the generated display signals.

* * * * *